(12) United States Patent
Kodialam et al.

(10) Patent No.: US 9,104,477 B2
(45) Date of Patent: Aug. 11, 2015

(54) SCHEDULING IN MAPREDUCE-LIKE SYSTEMS FOR FAST COMPLETION TIME

(75) Inventors: Muralidharan S. Kodialam, Marlboro, NJ (US); Tirunell V. Lakshman, Morganville, NJ (US); Sarit Mukherjee, Morganville, NJ (US); Hyunseok Chang, Holmdel, NJ (US); Myung Jin Lee, West Lafayette, IN (US)

(73) Assignee: Alcatel Lucent, Boulogne-Billancourt (FR)

( * ) Notice: Subject to any disclaimer, the term of this patent is extended or adjusted under 35 U.S.C. 154(b) by 542 days.

(21) Appl. No.: 13/101,626

(22) Filed: May 5, 2011

(65) Prior Publication Data

US 2012/0284727 A1 Nov. 8, 2012

(51) Int. Cl.
G06F 9/46 (2006.01)
G06F 9/48 (2006.01)

(52) U.S. Cl.
CPC .................... *G06F 9/4881* (2013.01)

(58) Field of Classification Search
CPC ..................................... G06F 9/4881
See application file for complete search history.

(56) References Cited

U.S. PATENT DOCUMENTS

| | | | |
|---|---|---|---|
| 7,444,638 B1 * | 10/2008 | Xu | 718/104 |
| 8,402,449 B1 * | 3/2013 | Biswas et al. | 717/146 |
| 2008/0086442 A1 | 4/2008 | Dasdan et al. | |
| 2008/0120314 A1 | 5/2008 | Yang et al. | |
| 2008/0133474 A1 | 6/2008 | Hsiao et al. | |
| 2010/0005080 A1 | 1/2010 | Pike et al. | |
| 2010/0122065 A1 | 5/2010 | Dean et al. | |
| 2010/0205075 A1 | 8/2010 | Zhang | |
| 2010/0257198 A1 | 10/2010 | Cohen et al. | |
| 2010/0281166 A1 | 11/2010 | Buyya et al. | |
| 2011/0047172 A1 | 2/2011 | Chen et al. | |
| 2011/0055243 A1 | 3/2011 | Kunnummal | |
| 2011/0055559 A1 | 3/2011 | Li et al. | |
| 2011/0066649 A1 | 3/2011 | Berlyant et al. | |
| 2011/0066894 A1 | 3/2011 | Berlyant et al. | |
| 2012/0180055 A1 * | 7/2012 | Brech et al. | 718/102 |

* cited by examiner

*Primary Examiner* — Camquy Truong
(74) *Attorney, Agent, or Firm* — Chiesa Shahinian & Giantomasi

(57) ABSTRACT

A method and system for scheduling tasks is provided. A plurality of lower bound completion times is determined, using one or more computer processors and memory, for each of a plurality of jobs, each of the plurality of jobs including a respective subset plurality of tasks. A task schedule is determined for each of the plurality of processors based on the lower bound completion times.

12 Claims, 4 Drawing Sheets

| JOB | LOWER BOUND COMPLETION TIMES | RANKING |
|---|---|---|
| 25 | 5 | 1 |
| 19 | 11 | 2 |
| 17 | 12 | 3 |
| ⋮ | ⋮ | ⋮ |
| 2 | 13 | 139 |
| 8 | 14 | 140 |
| 10 | 17 | 141 |
| 1 | 19 | 142 |

SCHEDULING IN MAPREDUCE-LIKE SYSTEMS FOR FAST COMPLETION TIME

FIELD OF THE INVENTION

The present invention is generally directed to scheduling tasks in a computing environment and more particularly to optimized scheduling of related sets of tasks across multiple processors.

BACKGROUND

Large-scale data processing needs are met using distributed and parallel computing data centers. MapReduce is a programming model used by these data centers for various applications such as indexing, mining, social networking, recommendation services, and advertising backends. MapReduce includes a map phase and a reduce phase. In the map phase, a dataset is partitioned into several smaller chunks that are assigned to individual nodes for partial computation of results. The results are computed at each node in the form of key-value pairs on the original data set. During the reduce phase, key-value pairs generated as a result of the map phase are aggregated based on the key-value pairs. Within a data center, a centralized master program orchestrates the assignment and scheduling of jobs, each of which includes several map and reduce tasks. The assignment and scheduling functions determine which tasks are assigned to a particular node. The master keeps track of the progress of individual tasks in order to determine where to assign and when to schedule individual tasks. Since several MapReduce jobs are often performed in parallel, scheduling problems often arise due to varying workloads and job size distributions.

SUMMARY

In accordance with an embodiment of the invention, a method and system for scheduling tasks is provided. A plurality of lower bound completion times, using one or more computer processors and memory, is determined for each of a plurality of jobs, each of the plurality of jobs including a respective subset plurality of tasks. A task schedule is determined for each of a plurality of processors based on the lower bound completion times.

In an embodiment, tasks are scheduled at each processor based on the task schedule.

In an embodiment, determining the lower bound completion times includes solving a linear program to determine the lower bound completion times. The linear program is determined by the equation $$Z^{LP} = \min \sum_{j \in J} w_j C_j$$

wherein $Z^{LP}$ is a minimum weighted completion time, j is a job in a plurality of jobs J, $w_j$ represents a weight of each job, and $C_j$ represents a calculated completion time of each job. Determining the lower bound completion times may be performed in response to the arrival of a new job or at a predetermined time in response to the arrival of new jobs during the predetermined time interval.

In an embodiment, determining the task schedule includes determining a ranked order of the plurality of jobs based on the lower bound completion time of each of the plurality of jobs.

In an embodiment, the lower bound completion times and task schedule are determined according to weighting factors assigned to each of the plurality of jobs.

These and other advantages will be apparent to those of ordinary skill in the art by reference to the following detailed description and the accompanying drawings.

DETAILED DESCRIPTION

Figures 1, 2:
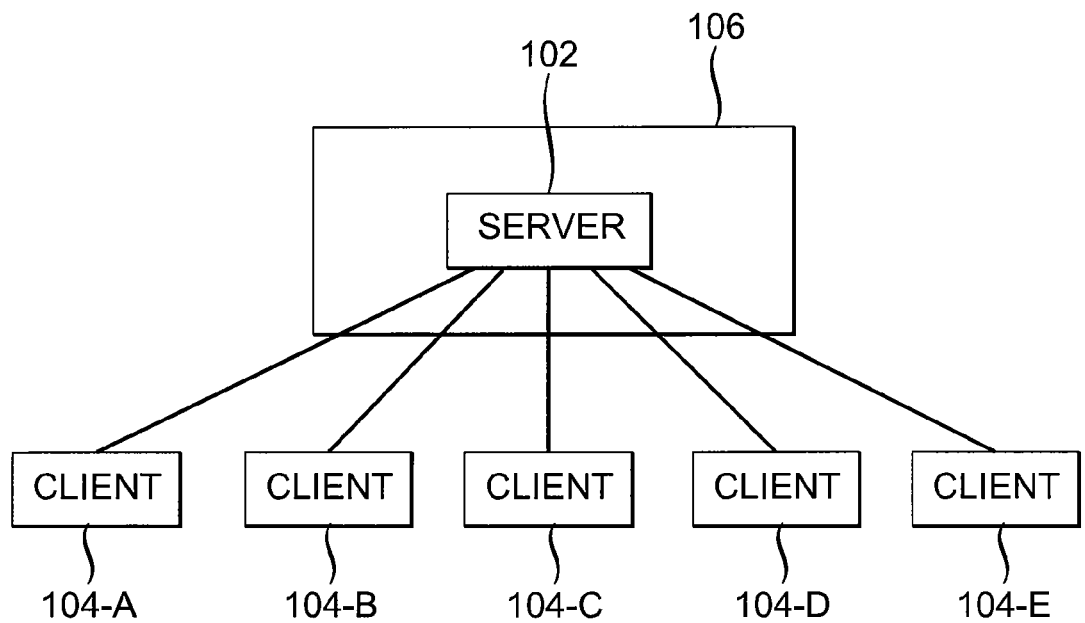
FIG. 1 is an exemplary diagram of a computing environment in which tasks can be scheduled and assigned in accordance with an embodiment of the present invention.
FIG. 2 is an exemplary diagram of a task schedule in accordance with an embodiment of the present invention.

FIG. 1 is an exemplary diagram of a computing environment in which tasks can be scheduled and assigned in accordance with an embodiment of the present invention. Server 102 may reside at a data center 106, which is responsible for receiving and assigning jobs within a distributed computing environment to clients 104-A, 104-B, 104-C, 104-D, and 104-E. Each job includes tasks, such as map and reduce tasks. Server 102 is also responsible for generating a task schedule representing an order of tasks to be performed by each of the clients.

Server 102 may receive groups of jobs in bulk or receive individual jobs one at a time. As jobs arrive at server 102, the jobs are processed such that all tasks associated with each job are assigned to clients 104. The tasks may be assigned based on several factors, such as a current workload of a particular client or based on the capabilities of a particular client. After all tasks are assigned to clients 104, server 102 determines an optimal scheduling of the tasks with each client in order to minimize total job completion times across all of the clients 104. The completion time of a job is defined as the time needed for all tasks belonging to a respective job to be performed by clients 104.

In order to determine the optimal scheduling of tasks for each client, server 102 determines a lower bound completion time for each job. The lower bound completion time for a job represents the shortest possible completion time for performing a particular job across all clients 104. Thus, each lower bound completion time represents an ideal completion time. The lower bound completion times are determined based on a linear program. A linear program is determined based on constraints such as the processing times of each job, release times of each job, and weights associated with each job specifying the importance of each job. The release time of each job represents the arrival time of the job at server 102. More specific information regarding the linear program is provided in the paragraphs below.

The lower bound completion times may be determined each time server 102 receives a new job or alternatively at predetermined time intervals as long as new jobs are received by server 102 during the predetermined time interval.

After the lower bound completion time for each job has been determined, the lower bound completion times are used to determine a task schedule for any clients that have been assigned tasks associated with the jobs. The task schedule is determined by ranking all jobs based on their lower bound completion times. Typically, to ensure that all jobs are performed in the shortest time, the jobs are ranked in order of shortest lower bound completion time to longest lower bound completion time. The actual ranking of jobs is performed using an approximation algorithm that ensures that the actual summed weighted completion time of performing the jobs is less than or equal to a factor of the summed weighted lower bound completion time of jobs. More detail regarding the approximation algorithm is provided in the paragraphs below.

The task schedule is then used by server 102 to schedule tasks according to the order of jobs in the task schedule at each client 104A, 104-B, 104-C, 104-D, and 104-E. It should be further understood that while the embodiment described herein is with respect to a particular number of clients, any number of clients may be utilized. It should be understood that while described with respect to a central server 102 and multiple separate clients 104, the present invention can be adapted to a multi-processor computer or combination of a distributed environment with multi-processor computers such that server 102 may represent a master processor of a computer and each client 104 may represent a processor in a parallel computing environment.

FIG. 2 is an exemplary diagram of a task schedule in accordance with an embodiment of the present invention. An exemplary task schedule 202 is shown including a listing of jobs 204 and corresponding lower bound completion times 206, and a ranking 208. As shown by task schedule 202, the jobs are ranked based on shortest lower bound completion time to longest lower bound completion time. For example, job 25 has lower bound completion time of '5' and thus the highest task schedule ranking of '1.' In contrast, job 1 has the longest corresponding lower bound completion time of '19' and has a task schedule ranking of '142.'

As mentioned above, for each client 104, server 102 will schedule tasks based on the task schedule. Task scheduling is based on task schedule 202. For example, if client 104-A is assigned certain tasks corresponding to jobs 25, 17, and 142, according to the task schedule, client 104-A will perform the tasks according to the job schedule ranking. This means that all tasks corresponding to job 25 are performed first, followed by the tasks corresponding to job 17, and then the tasks corresponding to job 142. Tasks will be performed in a similar order if, for example, client 104-B is assigned tasks corresponding to jobs 19, 2, and 8. Tasks corresponding to job 19 will be performed first, followed by tasks corresponding to job 2, and then tasks corresponding to job 8. It is understood that task schedule 202 is exemplary and may include more than or less than the number of jobs shown. It is also understood that each client 104 may be assigned tasks corresponding to any number of jobs.

Figure 3:
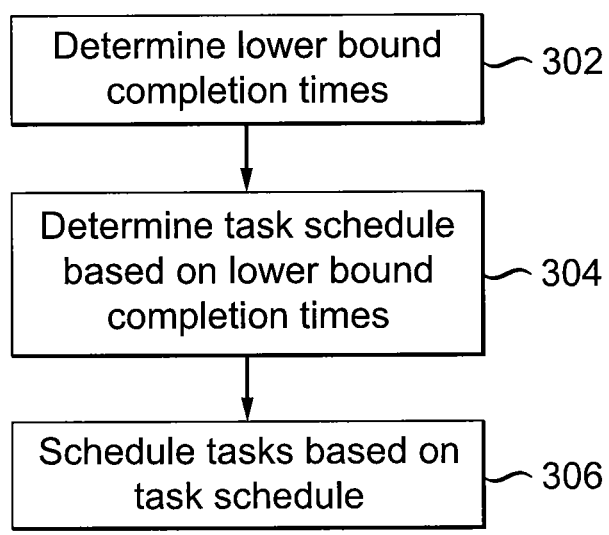
FIG. 3 is a flowchart of a process for scheduling tasks in accordance with an embodiment of the present invention.

FIG. 3 is a flowchart of a process for scheduling tasks in accordance with an embodiment of the present invention. Server 102 is configured to schedule a plurality of tasks, wherein each task is assigned to one of a plurality of clients 104. At step 302, a plurality of lower bound completion times for each of a plurality of jobs is determined. Each of the plurality of jobs includes a respective subset plurality of tasks. The determination of the plurality of lower bounds may be performed either in response to server 102 receiving at least one new job including tasks that need to be assigned to clients 104, or in response to receiving at least one new job during a predetermined time interval. Determining the plurality of lower bounds includes solving a linear program to determine the lower bound completion times.

At step 304, a task schedule for each of the plurality of clients is determined based on the lower bound completion times. Specifically, a ranked order of the plurality of jobs is determined using the lower bound completion times of each of the plurality of jobs. The ranked order is used as the task schedule. At step 306, tasks that have been assigned to each client are scheduled based on the task schedule.

In order to fully discuss the aforementioned linear program and approximation algorithm, the theoretical framework for scheduling jobs and tasks to clients or processors follows. If a server is responsible for m clients or a computer with m processors with n jobs assigned to the m processors, M may be used to represent the set of processors and J to represent the set of jobs that need to be processed. Each job J∈J includes of $n_j$ tasks each of which is assigned to a processor. $M_j \subseteq M$ represents the set of processors required to process job j. It is assumed that each processor can process at most one task at a time. In practice, processors may run multiple tasks simultaneously and preempt each other.

Each job j is assumed to be available for processing at time $r_j$, the release time or arrival time of job j at server 102. A weight $w_j$ may also be applied to each job, which specifies its importance.

The finish time of job j on a client or processor $p \in M_j$, is denoted by $f_{jp}$, the time at which the task of job j is completed on processor p. The completion time of a job, $C_j$ is defined as the time at which all tasks belonging to a job j are finished. Therefore the completion time of job j, is $$C_j = \max_{p \in M_j} f_{jp},$$

where $J_p$ denotes the set of jobs that have a task assigned to processor p. Therefore $j \in J_p$ if and only if $p \in M_j$.

The objective of scheduling is to determine the ordering of tasks on each processor in order to minimize the weighted sum of the job completion times $\Sigma_{j \in J} w_j C_j$. Assuming that scheduling takes place offline, all job arrival times, $r_j$ are known in advance. Scheduling problems, however, arise online when jobs are released over time and the job release times are not known in advance. Also, while it is assumed that processing times are known processing times are generally estimated and thus estimation errors must be taken into account.

An algorithmic approach is ideal for solving the problem of scheduling tasks. As discussed a linear program is derived to determine a lower bound completion time for each job. However since the lower bound completion times represent the absolute minimum possible completion time, it is not always feasible that this completion time be achieved. Thus, the lower bound completion times are used in order to determine the resulting task schedule where the weighted completion time of completing the jobs according to the task schedule is within a factor of the weighted sum of the lower bound completion times.

A linear program for determining the lower bound completion times for jobs will be described. Assuming $t_{jp}$ denotes the processing time of job j on processor p, and $J_p$ denotes the set of jobs on processor p, the linear program (LP_OPT_SCHED) discussed below provides the lower bound on a minimum weighted completion time schedule.

The linear program is represented by:

$$Z^{LP} = \min \sum_{j \in J} w_j C_j$$

-continued $$\sum_{j \in S} t_{jp} C_j \geq f(S, p) \ \forall \ S \subseteq J_p \forall \ p \quad (1)$$

$$C_j \geq r_j + h_j \forall \ j \quad (2)$$

where $$f(S, p) = \frac{1}{2} \left[ \sum_{j \in S} t_{jp}^2 + \left( \sum_{j \in S} t_{jp} \right)^2 \right] \text{ and } h_j = \max_{p \in M_j} t_{jp}.$$

$Z^{LP}$ represents an optimal solution to linear program (LP_OPT_SCHED) representing the lower bound completion time and $f(S,p)$ represents the finish time of all jobs S on a particular processor p.

A proof for the aforementioned linear program is described for completeness. Fix a processor p and consider the set of jobs $J_p$ that are assigned to processor p. Consider a subset $S \subset J_p$ and let $S = \{1, 2, \ldots, k\}$. Let $f_{jp}$ denote the finish time of job j on processor $p \in M_j$. Assume that the jobs in S are processed before any job in $J_p$ in a subset S. Assume that the jobs are processed in the order $1, 2, \ldots k$. Since a lower bound is determined, $r_j$ is ignored, and in this case $$f_{jp} = \sum_{i=1}^{J} t_{ip} \text{ and } \sum_{j \in S} t_{jp} f_{jp} = \sum_{j=1}^{k} t_{jp} \left( \sum_{i=1}^{j} t_{ip} \right) = f(S, p).$$

Note that $f(S, p)$ is symmetric in $t_{jp}$ and therefore its value is independent of the order in which the jobs in set S are processed. Moreover, $\Sigma_{j \in S} t_{jp} f_{jp}$ only increases if some job in $J_p$ in a subset S is processed along with jobs in S. This holds for any subset S of $J_p$. Since $$C_j \geq f_{jp}, \Sigma_{j \in S} t_{jp} C_j \geq \Sigma_{j \in S} t_{jp} f_{jp}$$

thus giving the constraints in (1). The constraints in (2) states that the completion time of job j on cannot be less than the sum of the arrival time of the job and the maximum processing time of the job on any processor.

Note that in Equation (1) of the linear program, there are an exponential number of constraints for each processor. The polyhedron for each processor is a polymatroid. In this case, the job completion times lie in the intersection of m polymatroids, one belonging to each processor. The constraints in the linear program only represent necessary conditions, and therefore, $Z^{LP}$, the optimal solution to the linear program, only represents a lower bound of the optimal solution, which is the lower bound completion time. We illustrate this by the following example: Consider a two job, two processor problem. The processing times are $t_{11}=1$; $t_{12}=2$; $t_{21}=2$; $t_{22}=1$: Let $w_1=w_2=1$ and $r_1=r_2=0$. In this case the linear programming problem is $$\min C_1 + C_2$$
$$C_1 \geq 1 \qquad 2C_1 \geq 4$$
$$2C_2 \geq 4 \qquad C_2 \geq 1$$
$$C_1 + 2C_2 \geq 7 \quad 2C_1 + C_2 \geq 7$$

The three constraints on the left are for processor 1 and the three constraints on the right are for processor 2. The optimal solution to the linear program is $C_1=C_2=7/3$ giving $Z^{LP}=14/3=4.67$. An optimal schedule is to schedule job 1 on both machines first, followed by job 2. The completion time of job 1 is 2 and the completion time of job 2 is 3 giving a total completion time of 5. Since the linear program does not give an actual schedule, an algorithm is necessary to produce a feasible ordering of jobs on different processors, which is discussed further in the paragraphs below.

One approach to solving the linear program involves using an ellipsoid algorithm with a separation oracle. Though this will result in a polynomial time algorithm, it is not a practical approach due to the high level of complexity associated with polynomial time algorithms. Thus, a primal dual algorithm is better suited for solving the linear program.

To solve the primal dual algorithm, the dual variable $\pi_p^S$ is associated with equation (1) of the linear program. The dual variable is then used in the equation shown:

$$\max \sum_m \sum_{S \subseteq J_p} f(S, p) \pi_p^S$$

$$\sum_m t_{jp} \sum_{S \subseteq J_p : S \ni j} \pi_p^S \leq w_j \ \forall \ j$$

$\pi_p^S$ represents dual variables and $C_j$ represents primal variables.

An outline of algorithm PRIMAL_DUAL is presented below:

| | |
|---|---|
| 1) | Initialize $C_j = \dfrac{\delta}{w_j}$ for all jobs j. |
| 2) | Find the processor $\bar{p}$ and subset of jobs $\bar{S} \subseteq J_p$ that minimizes Equation (4). |
| 3) | Find the job $\bar{j} \in \bar{S}$ that minimizes $\dfrac{w_j}{p_{jp}}$. |
| 4) | Set $\pi_{\bar{p}}^{\bar{S}} \leftarrow \pi_{\bar{p}}^{\bar{S}} + \dfrac{w_j}{p_{jm}}$. |
| 5) | Set $C_j \leftarrow C_j + \epsilon \left(1 + \dfrac{w_j/p_{jm}}{w_j/p_{jm}}\right)$. |

Figure 4:
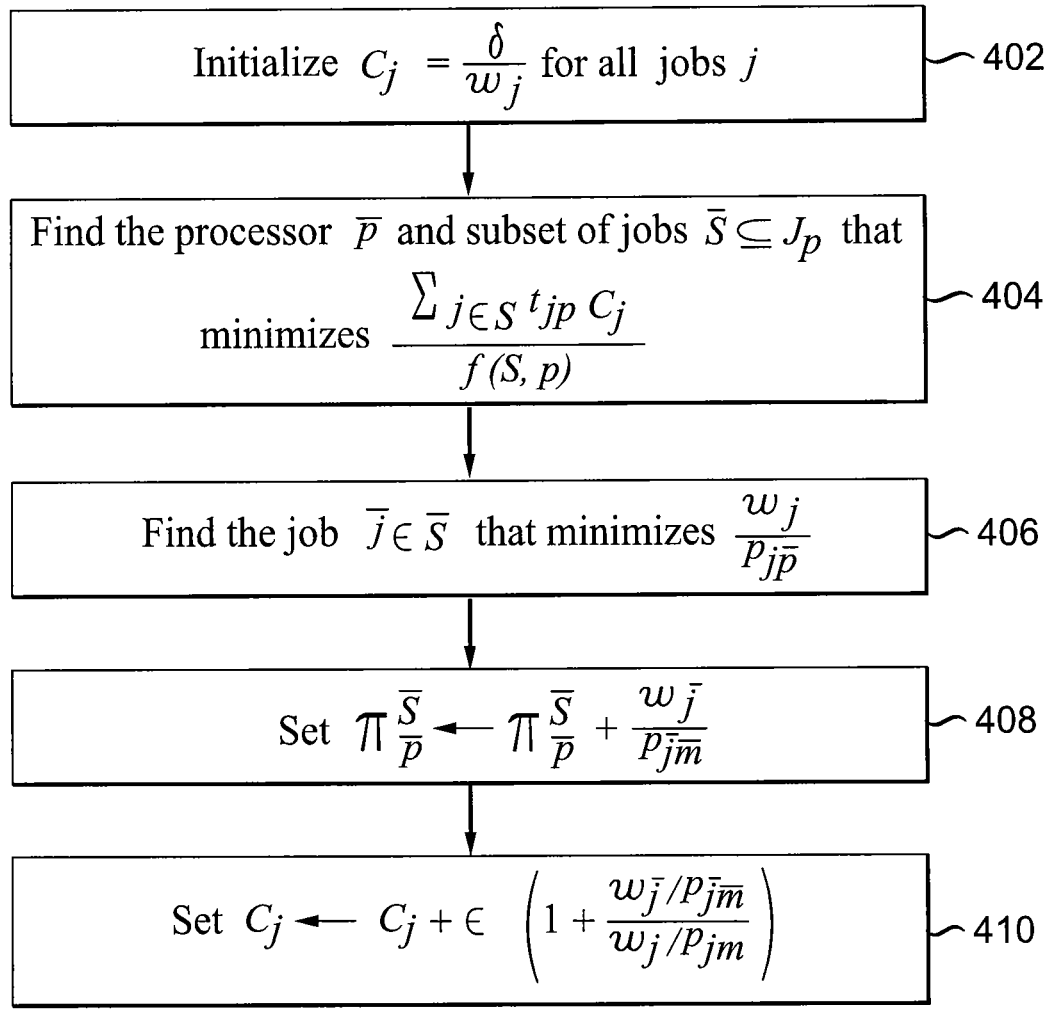
FIG. 4 is a flowchart of an algorithm for scheduling tasks in accordance with an embodiment of the present invention.

FIG. 4 is a flowchart of an algorithm for scheduling tasks in accordance with an embodiment of the present invention. More specifically, FIG. 4 is a flowchart of the PRIMAL_DUAL algorithm. Given any $\epsilon > 0$, a combinatorial approach may be used to solve the maximization linear program to within a factor of $(1-\epsilon)^2$ of the optimal solution.

The primal dual-algorithm initializes completion time $C_j = \delta/w_j$ for all jobs j at step 402, where $\delta$ is a parameter based on $\epsilon$.

At step 404, the processor subset combination $(\bar{p}, \bar{S})$ that minimizes $$\dfrac{\sum_{j \in S} t_{jp} C_j}{f(S, p)} \quad (4)$$

is identified for current values of $C_j$.

This processor-subset combination represents a column in the linear program. This is equivalent to picking the entering variable in a standard simplex algorithm.

At step 406, the blocking row, a job j from set S is found. The blocking row is the job that minimizes $$\frac{w_j}{p_{jp}}.$$

At step 408, $$\pi_p^{\bar{S}} \leftarrow \pi_p^{\bar{S}} + \frac{w_j}{p_{jm}}$$

representing the dual variables, is set.

At step 410, the values are updated and the algorithm PRIMAL_DUAL outlined above may be repeated. The following paragraphs provide a theorem that serves as a proof for the primal dual algorithm described.

Given $\epsilon > 0$ and $$\delta = (1+\epsilon)((1+\epsilon)n)^{\frac{1}{\epsilon}}$$

the algorithm PRIMAL_DUAL computes an optimal solution to the linear program in at most $$n \frac{1}{\epsilon} \log_{1+\epsilon} n$$

iterations, where n is the number of jobs in the system. Each iteration represents a lower bound completion time for a particular job.

One aspect of solving the linear program is to determine a processor-subset combination that minimizes Equation (4). Although completion time values are known, there may be an exponential number of subsets to be checked. Thus, a straightforward brute force approach is not appropriate. Instead, the structure of the scheduling polyhedron can be exploited to develop a simple polynomial time algorithm to solve the problem. Thus, on any processor, at most n sets need to be checked.

Since jobs $J_p$ on processor p are configured such that $$C_1 \leq C_2 \leq \ldots C_k, \text{ where } |J_p| = k$$

Equation (4) is minimized by a set S of $\{1, 2, \ldots, m\}$ for m=2, 3, . . . , k. Assuming that S minimizes Equation (4) for processor p, a job k∈S is found in order to determine what happens to Equation (4) when evaluating for S k. Letting $$g(S,p) = \Sigma_{j \in S} t_{jp} C_j$$

results in:

$$\frac{g(S \setminus k, p)}{f(S \setminus k, p)} = \frac{g(S, p) - t_{kp} C_k}{f(S, m) - \left(\sum_{j \in S} t_{jp}\right) t_{kp}}$$

Since S minimizes Equation (4), $$C_k \leq \frac{g(S, p) p(S, p)}{f(S, p)}$$

Where $P(S,p) = \Sigma_{j \in S} t_{jp}$. Considering that some $k \in J_p \setminus S$, then $$\frac{g(S \cup k, p)}{f(S \cup k, p)} = \frac{g(S, p) + t_{kp} C_k}{f(S, p) + t_{kp}^2 + \left(\sum_{j \in S} t_{jp}\right) t_{kp}}$$

Since S minimizes Equation (4), it can be shown that $$C_k \geq \frac{g(S, p) p(S, p)}{f(S, p)} + \frac{t_{kp} g(S, p)}{f(S, p)}.$$

Note that k∈S if any only if $$C_k \leq \frac{g(S, p) p(S, p)}{f(S, p)}.$$

This implies that if two jobs $j, k \in J_p$ and $C_j \leq C_k$, then $j \in S$ if $k \in S$.

Since tasks of each job can potentially be assigned to all available processors, the running time of the algorithm is O(nm). The primal-dual algorithm for solving LP_OPT_SCHED is similar to the primal-dual algorithm PRIMAL_DUAL outlined above. The only change is that there are n additional dual variables corresponding to the release time constraint for each job. These n additional variables are updated separately.

The solution of LP_OPT_SCHED can be used to design a 3-approximation algorithm. This algorithm is referred to as OFFA. The superscript LP is used to denote the linear program solution and OFFA to denote the approximation algorithm. Letting $C_j^{LP}$ denote job completion times corresponding to the optimal linear program solution, algorithm OFFA can be used to determine a task schedule representing the optimal ordering of jobs on processors.

Specifically, algorithm OFFA is described below.

| | Algorithm OFF A |
|---|---|
| 1) | Solve LP_OPT_SCHED and let $C_j^{LP}$ denote the completion time of job j. On each processor p, the jobs in $J_p$ are processed in the order output by the LP. |
| 2) | Given a job j ∈ $J_p$, let $P(j,p) = \{k : k \in J_p, C_k^{LP} \leq C_j^{LP}\}$ denote the set of jobs on p whose LP completion time is lower than j. These are jobs that will be scheduled before job j on processor p. |
| 3) | A job is started as soon as the previous job is complete or the job becomes available whichever is later. The finish time of job j on machine p denoted by $f_{jp}^{OFF\ A}$ is $$f_{jp}^{OFF\ A} = \max\left\{r_j, \max_{k \in P(j,p)} f_{kp}^{OFF\ A}\right\} + t_{jp}.$$ |
| 4) | The completion time of job j $$C_j^{OFF\ A} = \max_{p \in M_j} f_{jp}^{OFF\ A}.$$ |

$Z^{LP}$ and $Z^{OFFA}$ denote the objective function value of LP_OPT_SCHED and the sum weighted completion time from algorithm OFFA, respectively. Thus, $$Z^{OFFA} \leq 3 Z^{LP}.$$

$f_{jp}^{OFFA}$ denotes the finish time of job j on processor p and $$P(j,p) = \{k : k \in J_p, C_k^{LP} < C_j^{LP}\} \cup \{j\}.$$

$f_{jp}^{OFFA} \leq \max_{k \in P(j,p)} r_k + \Sigma_{k \in P(j,p)} t_{kp}$. From Equation (2) of the linear program, note that $r_k \leq C_k^{LP}$ and $C_k^{LP} \leq C_j^{LP}$ from the definition of P(j,p). Therefore, $$f_{jp}^{OFFA} \leq C_j^{LP} + \sum_{k \in P(j,p)} t_{kp}. \quad (5)$$

Applying Equation (1) to the set S=P(j,p) on processor p, then $$\sum_{k \in P(j,p)} t_{kp} C_k^{LP} \geq f(P(j,p),p) \geq \frac{1}{2}\left(\sum_{k \in P(j,p)} t_{kp}\right)^2.$$

Based on the fact that $C_j^{LP} \geq C_k^{LP}$ for all $k \in P(j,p)$, then $$C_j^{LP} \sum_{k \in P(j,p)} t_{kp} \geq \frac{1}{2}\left(\sum_{k \in P(j,p)} t_{kp}\right)^2.$$

Therefore, $$\sum_{k \in P(j,p)} t_{kp} \leq 2C_j^{LP}$$

and applying these to Equation (5) results in $f_{jp}^{OFFA} \leq 3C_j^{LP}$.

This result holds for all $p \in M_j$. Since $C_k^{OFFA} = \max_{p \in M_j} f_{jp}^{OFFA}$ then $C_k^{OFFA} \leq 3C_k^{LP} \forall k$ implying that the solution given by algorithm OFFA is less than three times the optimal solution.

When all jobs are available initially, a specific linear program LP_BULK_ARRIVAL is used. LP_BULK_ARRIVAL is represented by $$Z_B^{LP} = \min \sum_j w_j C_j$$

$$\sum_{j \in S} t_{jp} C_j \geq f(S,p) \; \forall S \subseteq J_p \forall p$$

This linear program provides lower bound completion times and is used to generate an approximation algorithm when all jobs are available at time zero. This approximation algorithm is referred to as OFFB. OFFB operates similarly to OFFA described above. Jobs are processed on processor p in the order of their LP_BLK_ARRIVAL completion times. Since job arrival times are not used, $$f_{jp}^{OFFB} = t_{jp} + \sum_{k \in P(j,p)} t_{kp}.$$

Letting $Z_B^{LP}$ and $Z^{OFFB}$ denote the objective function value of LP_BULK_ARRIVAL and the sum weighted completion time from algorithm OFFB respectively. Then $Z^{OFFB} \leq 2Z_B^{LP}$.

Algorithm OFFB processes jobs in the order of linear program completion times and thus $$f_{jp}^{OFFB} = \sum_{k \in P(j,p)} t_{kp}. \quad (6)$$

Applying Equation (1) to set S=P(j,p) on processor p, then $\Sigma_{k \in P(j,p)} t_{kp} \leq 2C_j^{LP}$. Applying these to Equation (6) results in $f_{jp}^{OFFB} \leq 2C_j^{LP}$. This result holds for all $P \in M_j$. Since $C_k^{OFFB} = \max_{p \in M_j} f_{jp}^{OFFB}$, then $C_k^{OFFB} \leq 2C_k^{LP}$ for all k implying that the solution given by algorithm OFFB is less than two times the optimal solution.

In practice, release times or arrival times of jobs are not always known in advance. Thus, when a new job arrives, all jobs currently in the system as well as the new job may be taken and used for LP_BULK_ARRIVAL. An optimal task schedule can then be determined based on the lower bound completion times. This task schedule may be used until the arrival of the next job. Alternatively, groups of arrival jobs may be gathered and LP_BULK_ARRIVAL run periodically.

Figure 5:
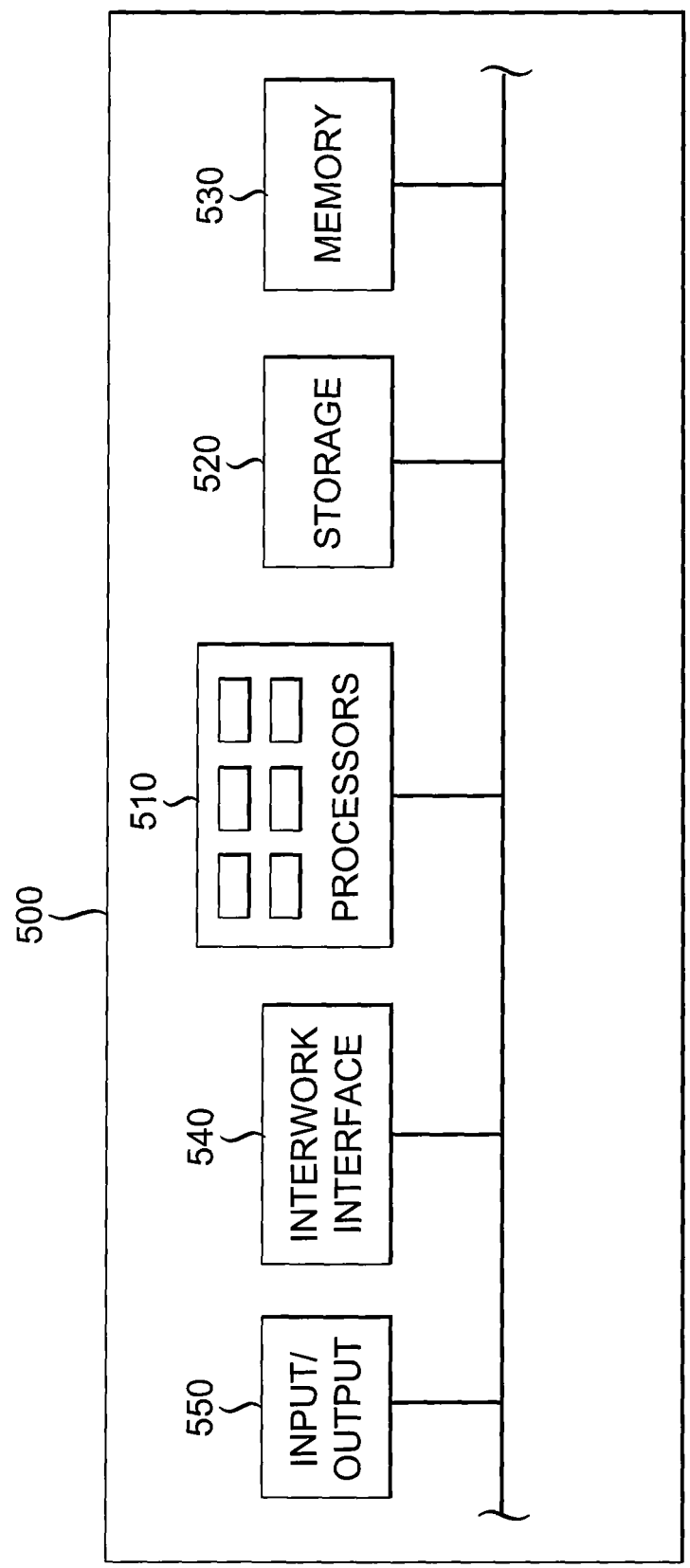
FIG. 5 is a high level diagram of a computer which may be used to implement certain embodiments of the present invention described herein.

The above-described methods and apparatus for scheduling tasks can be implemented on a computer using well-known computer processors, memory units, storage devices, computer software, and other components. A high-level block diagram of such a computer is illustrated in FIG. 5. Computer 500 contains a plurality of processors 510 which controls the overall operation of computer 500 by executing computer program instructions which define such operations. The computer program instructions may be stored in a storage device 520, or other computer readable medium (e.g., magnetic disk, CD ROM, etc.), and loaded into memory 530 when execution of the computer program instructions is desired.

Thus, the method steps of FIGS. 3 and 4 can be defined by the computer program instructions stored in the memory 530 and/or storage 540 and controlled by processors 410 executing the computer program instructions. For example, the computer program instructions can be implemented as computer executable code programmed by one skilled in the art to perform an algorithm defined by the method steps of FIGS. 3 and 4. Accordingly, by executing the computer program instructions, the processors 510 execute an algorithm defined by the method steps of FIGS. 3 and 4.

While computer 500 has been described as being used for compensating for frequency dependent imbalances in a signal in accordance with the method steps shown in FIGS. 3 and 4, computer 500 may also perform functionalities related to those described above in connection with the other Figures. Computer 500 also includes one or more network interfaces 540 for communicating with other devices via a network. Computer 500 further includes input/output devices 550 that enable user interaction with the computer 500 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the embodiments disclosed herein is not to be determined from the Detailed Description, but rather from the claims as interpreted according to the full breadth permitted by the patent laws. It is to be understood that the embodiments shown and described herein are only illustrative of the principles of the present embodiments and that various modifications may be implemented by those skilled in the art without departing from the scope and spirit of the embodiments described herein. Those skilled in the art could implement various other feature combinations without departing from the scope and spirit of the embodiments of the present disclosure.

We claim:

1. A computer-implemented method for scheduling a plurality of tasks, wherein tasks are assigned respectively to one of a plurality of processors, the method comprising:
   in response to respective arrivals of new jobs, determining, using one or more computer processors and memory, weighted lower bound completion times for a plurality of jobs respectively based on an importance of its respective job, wherein a job comprises a plurality of tasks; and
   determining, using one or more computer processors and memory, a task schedule for the plurality of processors respectively based on a ranked order of the plurality of jobs ranked according to the weighted lower bound completion times to reduce a weighted sum of job completion times.

2. The method of claim 1, further comprising scheduling, at the plurality of processors respectively, the tasks based on the task schedule.

3. The method of claim 1, wherein determining the weighted lower bound completion times comprises:
   solving a linear program to determine a lower bound completion time of a respective job in the plurality of jobs, wherein the linear program is determined by the equation $$Z^{LP} = \min \sum_{j \in J} w_j C_j,$$

wherein $Z^{LP}$ is a minimum weighted completion time, j is the respective job in the plurality of jobs J, $w_j$ represents a job weight, and $C_j$ represents a calculated job completion time.

4. The method of claim 1, further comprising:
   determining the respective weighted lower bound completion times for jobs in the plurality of jobs at a predetermined time interval in response to a respective new job arrival during the predetermined time interval.

5. An apparatus for scheduling a plurality of tasks, wherein tasks are assigned respectively to one of a plurality of processors, the apparatus comprising one or more computer processors and memory, the one or more computer processors and memory configured to:
   in response to respective arrivals of new jobs, determine weighted lower bound completion times for a plurality of jobs respectively based on an importance of its respective job, wherein a job comprises a plurality of tasks; and
   determine a task schedule for the plurality of processors respectively based on a ranked order of the plurality of jobs ranked according to the weighted lower bound completion times to reduce a weighted sum of job completion times.

6. The apparatus of claim 5, wherein the one or more computer processors and memory are further configured to:
   schedule, at the plurality of processors respectively, the tasks based on the task schedule.

7. The apparatus of claim 5, wherein the one or more computer processors and memory are further configured to:
   solve a linear program to determine a lower bound completion time of a respective job in the plurality of jobs, wherein the linear program is determined by the equation $$Z^{LP} = \min \sum_{j \in J} w_j C_j,$$

wherein $Z^{LP}$ is a minimum weighted completion time, j is the respective job in the plurality of jobs J, $w_j$ represents a job weight, and $C_j$ represents a calculated job completion time.

8. The apparatus of claim 5, wherein the one or more computer processors and memory are further configured to:
   determine the respective weighted lower bound completion time for jobs in the plurality of jobs at a predetermined time interval in response to a respective new job arrival during the predetermined time interval.

9. An article of manufacture including a tangible non-transitory computer-readable medium having instructions stored thereon, that in response to execution by a computing device cause the computing device to perform operations comprising:
   in response to respective arrivals of new jobs, determining weighted lower bound completion times for a plurality of jobs respectively based on an importance of its respective job, wherein a job comprises a plurality of tasks; and
   determining a task schedule for the plurality of processors respectively based on a ranked order of the plurality of jobs ranked according to the weighted lower bound completion times to reduce a weighted sum of job completion times.

10. The article of manufacture of claim 9, wherein the operations further comprise scheduling, at the plurality of processors respectively, the tasks based on the task schedule.

11. The article of manufacture of claim 9, wherein the operation of determining the weighted lower bound completion times comprises:
   solving a linear program to determine a lower bound completion time of a respective job in the plurality of jobs, wherein the linear program is determined by the equation $$Z^{LP} = \min \sum_{j \in J} w_j C_j,$$

wherein $Z^{LP}$ is a minimum weighted completion time, j is the respective job in the plurality of jobs J, $w_j$, represents a job weight, and $C_j$ represents a calculated job completion time.

12. The article of manufacture of claim 9, wherein the operation of determining the respective weighted lower bound completion times for jobs in the plurality of jobs is performed at a predetermined time interval in response to a respective new job arrival during the predetermined time interval.

* * * * *